(12) United States Patent
Kerai (10) Patent No.: US 10,701,514 B2
(45) Date of Patent: Jun. 30, 2020

(54) DETERMINING THE DISTANCE BETWEEN DEVICES IN A WIRELESS DATA EXCHANGE PROTOCOL

(71) Applicant: Dialog Semiconductor B.V., s-Hertogenbosch (NL)

(72) Inventor: Kanji Kerai, London (GB)

(73) Assignee: Dialog Semiconductor B.V., 's-Hertogenbosch (NL)

( * ) Notice: Subject to any disclaimer, the term of this patent is extended or adjusted under 35 U.S.C. 154(b) by 75 days.

(21) Appl. No.: 15/459,203

(22) Filed: Mar. 15, 2017

(65) Prior Publication Data

US 2017/0272906 A1 Sep. 21, 2017

Related U.S. Application Data

(63) Continuation-in-part of application No. 15/070,398, filed on Mar. 15, 2016.

(30) Foreign Application Priority Data

Nov. 18, 2016 (GB) .................................... 1619568.7

(51) Int. Cl.
*H04W 12/04* (2009.01)
*H04W 4/02* (2018.01)
(Continued)

(52) U.S. Cl.
CPC .............. *H04W 4/023* (2013.01); *H04W 4/80* (2018.02); *H04W 8/005* (2013.01);
(Continued)

(58) Field of Classification Search
CPC ....... H04W 4/80; H04W 4/023; H04W 8/005; H04W 12/04; H04W 12/06; H04W 84/18;
(Continued)

(56) References Cited

U.S. PATENT DOCUMENTS 7,735,116 B1 * 6/2010 Gauvin ................. G06F 21/552
713/153
9,204,251 B1 * 12/2015 Mendelson .............. G08G 1/14
(Continued)

FOREIGN PATENT DOCUMENTS

CN 101662768 3/2010
CN 101719830 6/2010
(Continued)

OTHER PUBLICATIONS

Ping Wang, Bluetooth Low Energy—privacy enhancement for advertisement, Jun. 2014, Norwegian University of Science and Technology, pp. 23-39. (Year: 2014).*
(Continued)

*Primary Examiner* — Ashokkumar B Patel
*Assistant Examiner* — William B Jones
(74) *Attorney, Agent, or Firm* — Saile Ackerman LLC; Stephen B. Ackerman (57) ABSTRACT

A method of determining a distance between a first and a second device in a wireless data exchange protocol is presented. The method includes sending an advertising channel Protocol Data Unit (PDU) from the first device; receiving the advertising channel PDU at the second device and responsively sending a scan request scanning PDU from the second device to the first device; receiving the scan request scanning PDU at the first device and responsively sending a scan response scanning PDU from the first device to the second device; calculating a time of flight (TOF) for at least one of the sent PDUs; and determining the distance between the first and second devices using the calculated TOF.

18 Claims, 7 Drawing Sheets

(51) Int. Cl.
*H04W 8/00* (2009.01)
*H04W 12/06* (2009.01)
*H04W 4/80* (2018.01)
*H04W 12/00* (2009.01)
*H04W 84/18* (2009.01)
*H04L 29/06* (2006.01)

(52) U.S. Cl.
CPC ......... *H04W 12/003* (2019.01); *H04W 12/04* (2013.01); *H04W 12/06* (2013.01); *H04L 63/0869* (2013.01); *H04W 12/00502* (2019.01); *H04W 12/00503* (2019.01); *H04W 84/18* (2013.01)

(58) Field of Classification Search
CPC .......... H04L 63/0869; G10A 2240/321; G05B 2219/25186; G05B 21/02771; H04M 2250/02; H04M 2017/2531; H04Q 2209/43; H04N 21/43637
See application file for complete search history.

(56) References Cited

U.S. PATENT DOCUMENTS

| | | | |
|---|---|---|---|
| 2003/0195723 A1 | 10/2003 | Bensky et al. | |
| 2010/0146273 A1 | 6/2010 | Kang et al. | |
| 2011/0069683 A1* | 3/2011 | Kohyama | H04L 5/0007 370/336 |
| 2013/0101121 A1* | 4/2013 | Nordholt | H04L 9/0852 380/279 |
| 2014/0344930 A1* | 11/2014 | Foley | H04L 63/1425 726/23 |
| 2014/0361906 A1* | 12/2014 | Hughes | H04Q 9/00 340/870.01 |
| 2015/0373749 A1* | 12/2015 | Palin | H04W 76/10 455/41.2 |
| 2018/0020421 A1* | 1/2018 | Kumar | H04W 12/02 |

FOREIGN PATENT DOCUMENTS

| | | |
|---|---|---|
| CN | 104742863 | 7/2015 |
| CN | 105303651 | 2/2016 |
| KR | 20020056372 | 7/2002 |
| KR | 20070006525 | 1/2007 |
| WO | WO0113598 | 2/2001 |
| WO | WO2004010720 | 1/2004 |

OTHER PUBLICATIONS

Ping Wang, Bluetooth Low Energy—Privacy enhancement for advertisement, NTNU, Jun. 2014, all (Year: 2014).*
Specification of the Bluetooth System: Core System Package [Host volume], vol. 3, Part H, Security Manager Specification, pp. 586-688, Dec. 2, 2014, Specification vol. 0 Table of Contents, 3 pgs, Specification vol. 3 Core System Package, 3 pgs.
Specification of the Bluetooth System: Core System Package [Low Energy Controller volume], vol. 6, Part E, Low Energy Link Layer Security, pp. 165-192, Dec. 2, 2014, Specification vol. 0 Table of Contents, 3 pgs, Revision History, 3 pgs.
"Bluetooth Low Energy—privacy enhancement for advertisement," by Ping Wang, NTNU—Trondheim Norweigian University of Sciency and Technology, Jun. 2014, pp. 1-75.
"A Formal Analysis of Bluetooth Device Discovery," by Marie Duflot et al., School of Computer Science, University of Birmingham, Birmingham, B15 2TT, UK, Jan. 2006, pp. 1-15.

* cited by examiner

┌─ 600
| A peripheral periodically broadcasts an advertising packet
| with a nonce. The nonce is different in every packet.

↓

┌─ 602
| A monitoring (central) device receives a broadcasted packet
| and receives the nonce. Immediately after receiving the
| broadcasted packet the monitoring device transmits a scan
| request PDU (SCAN_REQ) with a second nonce.

↓

┌─ 604
| Peripheral receives the SCAN_REQ packet and the second nonce.
| The peripheral then calculates (in less than 150us) the function
| AES(Key, nonce1, nonce2) where K is the Key already stored in
| the peripheral. The result of the calculation called RES1 which
| is then transmitted back to the monitoring device in a scan
| response PDU (SCAN RSP), along with other application data
| APP_DATA.

↓

┌─ 606
| The monitoring device receives the scan response PDU and the
| value RES1 as well as APP_DATA. The monitoring device then
| compares RES1 with its own calculation result of AES(K, Tn, Mn).
| If the results of the comparison are equal then the monitoring
| device makes use of the APP_DATA and if the comparison results
| are not equal the monitoring device discards the APP_DATA and
| black lists the Beacon.

DETERMINING THE DISTANCE BETWEEN DEVICES IN A WIRELESS DATA EXCHANGE PROTOCOL

This application is a Continuation-in-Part of U.S. application Ser. No. 15/070,398, filed on Mar. 15, 2016, which is owned by a common assignee and is herein incorporated by reference in its entirety.

TECHNICAL FIELD

The present disclosure relates to security improvements in a wireless data exchange protocol, and in particular to authentication of broadcaster devices. The present disclosure also relates to proximity or location detection in a wireless data exchange protocol.

Within this specification, the terms "broadcaster device" and "observer device" are used, as these are the terms used within the Bluetooth Low Energy (BLE) standard. However, they are not intended to confer any particular meaning. For instance, the terms "peripheral device" and "central device" could be used.

BACKGROUND

One popular protocol for wireless data exchange is known as Bluetooth. In particular, the Bluetooth Low Energy (BLE) standard, also referred to as Bluetooth Smart, provides a specification for the wireless exchange of data between fixed and/or mobile devices. Its operation is defined by various standards and specifications which are managed by the Bluetooth Special Interest Group.

However, existing security solutions for BLE and other wireless protocols rely on devices being connected with each other. There are no ways for non-connected devices to avoid attacks such as replay, relay or man-in-the-middle attacks.

BLE is designed for low power devices such as tags, beacons, watches, wearable devices, sensors and the like. Typically, these devices operate using a low power battery such as a coin cell battery to connect wirelessly to mobile phones, tablets, laptops, TVs, and the like which have connectivity to the internet.

There is an increasing demand for an accurate indoor positioning system (IPS), such as for locating and/or retail purposes, since GPS technology does not work well indoors. However, all current technologies for indoor use have their own limitations. Many BLE low power devices support a proximity feature which measures the distance between the devices. The proximity feature defined by the BLE specification uses Received Signal Strength Indication (RSSI) to calculate the distance. For instance, using a single beacon, the proximity to a nearby device can be determined; using a plurality of beacons and trilateration, a location can be determined for a nearby device. However, it is known that this method is relatively inaccurate and slow and has a high power consumption.

SUMMARY

According to a first aspect of the disclosure there is provided a method of authenticating a broadcaster device in a wireless data exchange protocol, wherein: the broadcaster device sends an advertising channel Protocol Data Unit (PDU) comprising a first nonce; an observer device receives the advertising channel PDU and said first nonce and sends a scan request scanning PDU to the broadcaster device, said scan request scanning PDU comprising a second nonce; the broadcaster device performs an encryption function using said first and second nonces to obtain a first result and sends a scan response scanning PDU back to the observer device, said scan response scanning PDU comprising said first result; the observer device performs an encryption function on said first and second nonces to obtain a second result and authenticates the broadcaster device if at least said first and second results match.

Optionally, the first and second nonces comprise random numbers.

Optionally, the observer device and broadcaster device are both provisioned with at least one key for performing the encryption function.

Optionally, the observer device and broadcaster device are both provisioned with at least two keys for performing the encryption function.

Optionally, at least one key is a private user key.

Optionally, the key is a 64-bit random number.

Optionally, the wireless data exchange protocol is a Bluetooth Low Energy protocol.

Optionally, the first nonce comprises a 64-bit, 128-bit or 256-bit random number and the second nonce comprises a 48-bit random number.

Optionally, said advertising channel PDU comprises a connectable undirected advertising event PDU or a scannable undirected advertising event PDU.

Optionally, said advertising channel PDU comprises an encrypted form of at least the first nonce.

Optionally, said advertising channel PDU comprises an encrypted form of a combination or concatenation of the first nonce and at least one key.

Optionally, the observer device encrypts at least the first nonce to obtain a third result and compares the third result with the encrypted form received from the advertising channel PDU.

Optionally, the observer device encrypts a combination or concatenation of the first nonce and at least one key to obtain a third result and compares the third result with the encrypted form received from the advertising channel PDU.

Optionally, the observer device sends the scan request scanning PDU to the broadcaster device only if the third result matches the encrypted form.

Optionally, said scan request scanning PDU comprises an encrypted form of the second nonce.

Optionally, said scan request scanning PDU comprises an encrypted form of a combination or concatenation of the second nonce and at least one key.

Optionally, the broadcaster device encrypts at least the second nonce to obtain a fourth result and compares the fourth result with the encrypted form received from the scan request scanning PDU.

Optionally, the broadcaster device encrypts a combination or concatenation of the second nonce and at least one key to obtain a fourth result and compares the fourth result with the encrypted form received from the scan request scanning PDU.

Optionally, the broadcaster device sends the scan response scanning PDU to the observer device only if the fourth result matches the encrypted form.

Optionally, a first time interval, which is the time between the scan request scanning PDU and the scan response scanning PDU, is 150 μs.

Optionally, the observer device authenticates the broadcaster device if the time between the scan request scanning PDU and the scan response scanning PDU is about the first time interval.

Optionally, the method includes the step of determining a distance between the broadcaster device and the observer device. Optionally, the step of determining the distance between the devices comprises calculating a time of flight (TOF) for at least one of the sent PDUs.

Optionally, the TOF is calculated during implementation of the BLE discovery protocol.

Optionally, the broadcaster device comprises a BLE beacon.

Optionally, the step of calculating the TOF includes determining a phase offset between at least two of the sent PDUs.

Optionally, each sent PDUs is transmitted using a carrier signal and the method includes determining an in-phase and a quadrature component of at least one carrier signal.

Optionally, the sent PDUs are transmitted using a multi-frequency carrier signal and the step of calculating the TOF includes determining a phase offset for a plurality of frequencies of the multi-frequency carrier signal. Optionally, the step of calculating the TOF includes determining a gradient of the sequence of phase offsets relative to frequencies of the multi-frequency carrier signal.

According to a second aspect of the disclosure there is provided a system for wireless data exchange comprising a broadcaster device and an observer device arranged to authenticate a broadcaster device wherein: the broadcaster device is arranged to send an advertising channel PDU comprising a first nonce; an observer device is arranged to receive the advertising channel PDU and said first nonce and sends a scan request scanning PDU to the broadcaster device, said scan request scanning PDU comprising a second nonce; the broadcaster device is arranged to perform an encryption function using said first and second nonces to obtain a first result and sends a scan response scanning PDU back to the observer device, said scan response scanning PDU comprising said first result; and the observer device is arranged to perform an encryption function on said first and second nonces to obtain a second result and to authenticate the broadcaster device if said first and second results match.

According to a third aspect of the disclosure there is provided a method of authenticating a broadcaster device in a wireless data exchange protocol, wherein the broadcaster device: sends an advertising channel PDU comprising a first nonce; receives a scan request scanning PDU to the broadcaster device, said scan request scanning PDU comprising a second nonce; and performs an encryption function using said first and second nonces to obtain a first result and sends a scan response scanning PDU back to the observer device, said scan response scanning PDU comprising said first result.

According to a fourth aspect of the disclosure there is provided a broadcaster device for use with a wireless data exchange protocol and being arranged to: send an advertising channel PDU comprising a first nonce; receive a scan request scanning PDU to the broadcaster device, said scan request scanning PDU comprising a second nonce; and perform an encryption function using said first and second nonces to obtain a first result; and to send a scan response scanning PDU back to the observer device, said scan response scanning PDU comprising said first result.

According to a fifth aspect of the disclosure there is provided a method of authenticating a broadcaster device in a wireless data exchange protocol, wherein an observer device: receives an advertising channel PDU from the broadcaster device, said advertising channel PDU comprising a first nonce; sends a scan request scanning PDU to the broadcaster device, said scan request scanning PDU comprising a second nonce; receives a scan response scanning PDU from the broadcaster device, said scan response scanning PDU comprising a first result being derived from an encryption function using said first and second nonces; performs an encryption function on said first and second nonces to obtain a second result; and authenticates the broadcaster device if said first and second results match.

According to a sixth aspect of the disclosure there is provided an observer device for use with a wireless data exchange protocol and being arranged to: receive an advertising channel PDU from the broadcaster device, said advertising channel PDU comprising a first nonce; send a scan request scanning PDU to the broadcaster device, said scan request scanning PDU comprising a second nonce; receive a scan response scanning PDU from the broadcaster device, said scan response scanning PDU comprising a first result being derived from an encryption function using said first and second nonces; perform an encryption function on said first and second nonces to obtain a second result; and authenticate the broadcaster device if said first and second results match.

According to a seventh aspect of the disclosure there is provided cryptographic authentication of a broadcaster device using a wireless search and discovery protocol.

According to an eighth aspect of the disclosure there is provided a method of determining a distance between a first and a second device in a wireless data exchange protocol, the method comprising: sending an advertising channel Protocol Data Unit (PDU) from the first device; receiving the advertising channel PDU at the second device and responsively sending a scan request scanning PDU from the second device to the first device; receiving the scan request scanning PDU at the first device and responsively sending a scan response scanning PDU from the first device to the second device; calculating a time of flight (TOF) for at least one of the sent PDUs; and determining the distance between the first and second devices using the calculated TOF.

Optionally, the wireless data exchange protocol is a Bluetooth Low Energy (BLE) protocol.

Optionally, the first device comprises a broadcaster device. Optionally, the first device comprises a BLE beacon. Optionally, the second device comprises an observer device. Optionally, the second device comprises one of a mobile phone, tablet and laptop.

Optionally, the step of calculating the TOF includes determining a phase offset between at least two of the sent PDUs.

Optionally, each sent PDUs is transmitted using a carrier signal. Optionally, the method includes determining an in-phase and a quadrature component of at least one carrier signal.

Optionally, the sent PDUs are transmitted using a multi-frequency carrier signal. Optionally, the step of calculating the TOF includes determining a phase offset for a plurality of frequencies of the multi-frequency carrier signal. Optionally, the step of calculating the TOF includes determining a gradient of the sequence of phase offsets relative to frequencies of the multi-frequency carrier signal.

Optionally, the method includes the step of authenticating the first device at the second device. Optionally, the advertising channel PDU includes a first nonce and the scan request scanning PDU includes a second nonce, and the first device is adapted to perform an encryption function using said first and second nonces to obtain a first result. Optionally, the scan response scanning PDU includes said first result, and the second device is adapted to perform an encryption function on said first and second nonces to obtain a second result. Optionally, the second device authenticates the first device if said first and second results match.

Optionally, the first and second nonces comprise random numbers.

Optionally, the first and second devices are both provisioned with at least one key for performing the encryption function. Optionally, the key is a 64-bit random number.

Optionally, the observer device and broadcaster device are both provisioned with at least two keys for performing the encryption function.

Optionally, at least one key is a private user key.

Optionally, the first nonce comprises a 64-bit, 128-bit or 256-bit random number and the second nonce comprises a 48-bit random number.

Optionally, said advertising channel PDU comprises a connectable undirected advertising event PDU or a scannable undirected advertising event PDU.

Optionally, said advertising channel PDU comprises an encrypted form of at least the first nonce.

Optionally, said advertising channel PDU comprises an encrypted form of a combination or concatenation of the first nonce and at least one key.

Optionally, the observer device encrypts at least the first nonce to obtain a third result and compares the third result with the encrypted form received from the advertising channel PDU.

Optionally, the observer device encrypts a combination or concatenation of the first nonce and at least one key to obtain a third result and compares the third result with the encrypted form received from the advertising channel PDU.

Optionally, the observer device sends the scan request scanning PDU to the broadcaster device only if the third result matches the encrypted form.

Optionally, said scan request scanning PDU comprises an encrypted form of the second nonce.

Optionally, said scan request scanning PDU comprises an encrypted form of a combination or concatenation of the second nonce and at least one key.

Optionally, the broadcaster device encrypts at least the second nonce to obtain a fourth result and compares the fourth result with the encrypted form received from the scan request scanning PDU.

Optionally, the broadcaster device encrypts a combination or concatenation of the second nonce and at least one key to obtain a fourth result and compares the fourth result with the encrypted form received from the scan request scanning PDU.

Optionally, the broadcaster device sends the scan response scanning PDU to the observer device only if the fourth result matches the encrypted form.

Optionally, a first time interval, which is the time between the scan request scanning PDU and the scan response scanning PDU, is 150 μs.

Optionally, the observer device authenticates the broadcaster device if the time between the scan request scanning PDU and the scan response scanning PDU is about the first time interval.

According to a ninth aspect of the disclosure there is provided a system for determining a distance between a first and a second device in a wireless data exchange protocol, the system comprising: a first device adapted to send an advertising channel Protocol Data Unit (PDU); a second device adapted to receive the advertising channel PDU and send a scan request scanning PDU to the first device, wherein the first device is adapted to receive the scan request scanning PDU and send a scan response scanning PDU to the second device, and wherein at least one of the first and second devices is adapted to calculate a time of flight (TOF) for at least one of the sent PDUs, and wherein at least one of the first and second devices is adapted to determine the distance between the first and second devices using the calculated TOF.

According to a tenth aspect of the disclosure there is provided a broadcaster device adapted to determine a distance between the broadcaster device and an observer device in a wireless data exchange protocol, wherein the broadcaster device is adapted to send an advertising channel Protocol Data Unit (PDU) to an observer device which responsively sends a scan request scanning PDU to the broadcaster device, and wherein the broadcaster device is adapted to receive the scan request scanning PDU and send a scan response scanning PDU to the observer device, and wherein the broadcaster device is adapted to calculate a time of flight (TOF) for the scan request scanning PDU and to determine the distance between the broadcaster device and the observer device using the calculated TOF.

According to an eleventh aspect of the disclosure there is provided an observer device adapted to determine a distance between the observer device and a broadcaster device in a wireless data exchange protocol, wherein the observer device is adapted to receive an advertising channel Protocol Data Unit (PDU) from the broadcaster device and responsively send a scan request scanning PDU to the broadcaster device, and wherein the observer device is adapted to receive a scan response scanning PDU from the broadcaster device, and wherein the observer device is adapted to calculate a time of flight (TOF) for the scan request scanning PDU and to determine the distance between the observer device and the broadcaster device using the calculated TOF.

BRIEF DESCRIPTION OF THE DRAWINGS

The disclosure will be described below, by way of example only, with reference to the accompanying drawings, in which.

DESCRIPTION

BLE is defined in various standards documents, including for example the "Specification of the Bluetooth System", Covered Core Package version 4.2, Volumes 1-7, which are hereby incorporated by reference. BLE defines two types of devices. A broadcaster device is assumed to be a low-power device that exposes state or information, and an observer device is a powered device with a relatively greater processing capability. Mobile devices such as smart phones or tablet computers may act as observer devices if they are equipped with the appropriate hardware and software.

BLE peripherals enter an advertising mode when they are turned on. Observer devices can receive the advertising protocol data units (PDUs) when they are within range and in a scanning state.

The BLE standard uses the unlicensed 2.4 GHz spectrum. The spectrum is divided into thirty-nine 2.0 MHz-wide channels. Three channels are reserved for advertising and the remainder are reserved for data.

Figure 1:
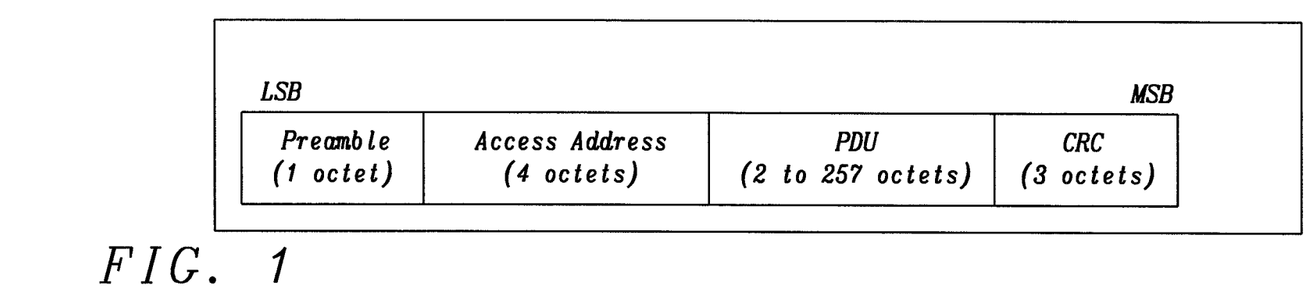
FIG. 1 shows a BLE link layer data format.

The BLE link layer defines a single packet format for both advertising and data channel packets. As shown in FIG. 1, this format specifies a preamble, an access address, a protocol data unit (PDU), and a cyclic redundancy check (CRC). The preamble is transmitted first, followed by the access address, then the PDU then the CRC.

The PDU may take various different formats. Specific advertising channel PDUs and data channel PDUs are defined depending on whether the packet is transmitted in an advertising physical channel or a data physical channel.

Figure 2:
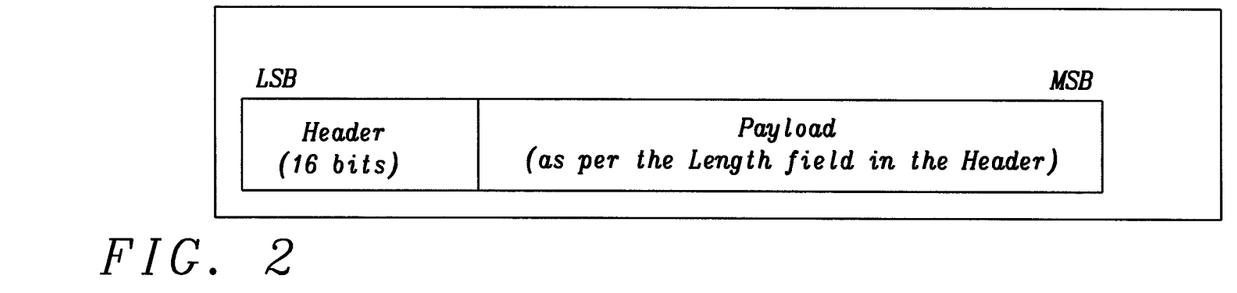
FIG. 2 shows an advertising channel PDU format.
Figure 3:
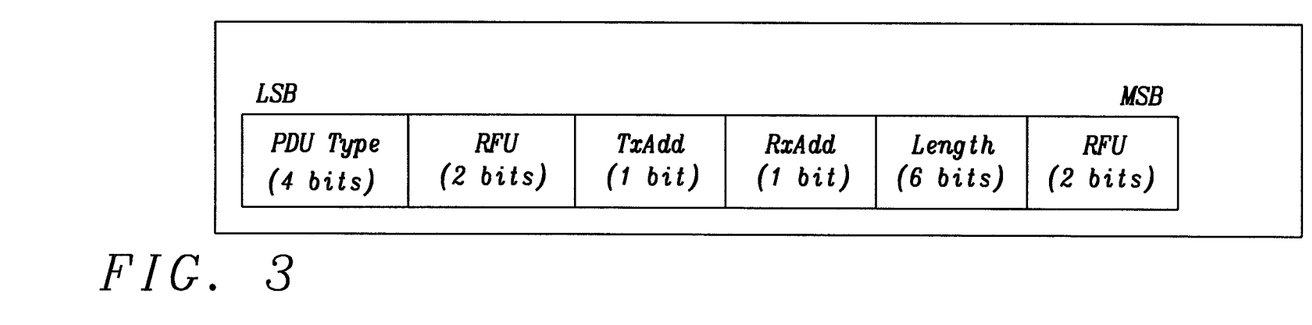
FIG. 3 shows the format of a header field of an advertising channel PDU.

The advertising channel PDU has a 16-bit header and a variable size payload, as shown in FIG. 2. The 16-bit header field of the advertising channel PDU is shown in FIG. 3.

There are various types of PDU, and the type is specified by the PDU Type field. The TxAdd and RxAdd fields contain information specific to each PDU type, and the length indicates the payload field length. There are two fields which are reserved for future use (RFU).

The advertising channel PDU types include the following, which are called advertising PDUs and are used in the specified events:
  ADV_IND: connectable undirected advertising event
  ADV_DIRECT_IND: connectable directed advertising event
  ADV_NONCONN_IND: non-connectable undirected advertising event
  ADV_SCAN_IND: scannable undirected advertising event A non-connectable event is one in which the transmission is one-way. The broadcaster transmits a string of data but will not respond to any request and cannot make a connection. A connectable event is one in which the broadcaster can exchange information with an observer device. An undirected advertising event is broadcast and can be received by any listening observer device. A directed advertising event is one which is targeted at a particular observer device.

Each of the ADV_IND, ADV_SCAN_IND and ADV_NONCONN_IND PDUs has a payload with an AdvA field containing the advertiser's address and an AdvData field containing advertising data from the advertiser's host. The advertiser's address is either public or random as indicated by TxAdd. The AdvA field may contain advertising data from the advertiser's host.

The ADV_DIRECT_IND PDU has a payload with an AdvA field containing the advertiser's address and an InitA field specifying the address of the device to which the PDU is addressed. The advertiser's address is either public or random as indicated by TxAdd, and the initiator's address is either public or random as indicated by RxAdd. This packet does not contain any host data.

The advertising channel PDU types include the following, which are called scanning PDUs and are used in the following states:
  SCAN_REQ: sent by the link layer in the scanning state, received by a link layer in the advertising state.
  SCAN_RESPONSE (also referred to as SCAN_RSP): sent by the link layer in the advertising state, received by a link layer in the scanning state.

The SCAN_REQ PDU has a payload which comprises a ScanA field containing the scanner's address which is public or random as indicate by TxAdd, and an AdvA field containing the address of the device to which this PDU is directed which is public or random as indicated by RxAdd. This packet does not contain any host data.

The SCAN_RESPONSE PDU has a payload which comprises an AdvA field containing the advertiser's address which is public or random as indicate by TxAdd, and a ScanRspData which may contain any data from the advertiser's host.

An initiating advertising channel PDU, CONNECT_REQ, is also provided. This is sent by the link layer in an initiating state and received by the link layer in the advertising state.

Figure 4:
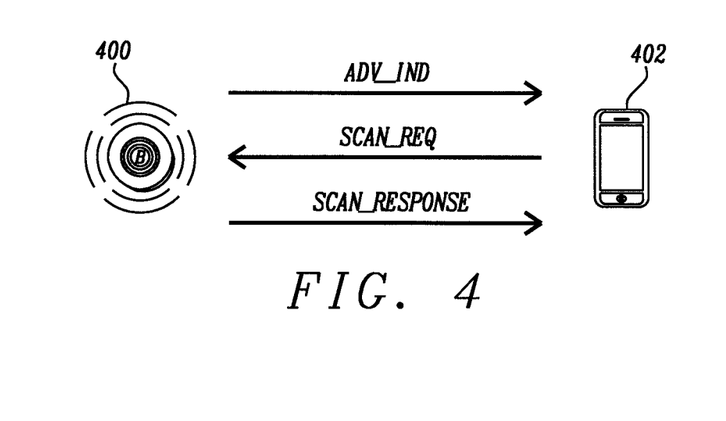
FIG. 4 illustrates the exchange of advertising channel PDUs.

FIG. 4 illustrates the exchange of advertising channel PDUs. A broadcaster device 400 sends an advertisement PDU, for example, ADV_IND. An observer device 402 responds with a scan request SCAN_REQ. Once this is received by the broadcaster device 400, it sends a scan response advertising channel PDU SCAN_RESPONSE with data for use by the observer device.

Certain aspects of the present disclosure involve making use of this discovery procedure to implement a new security solution. This means that even non-connected devices can be protected from replay attacks, whereby a valid data transmission is maliciously or fraudulently repeated or delayed.

Figure 5:
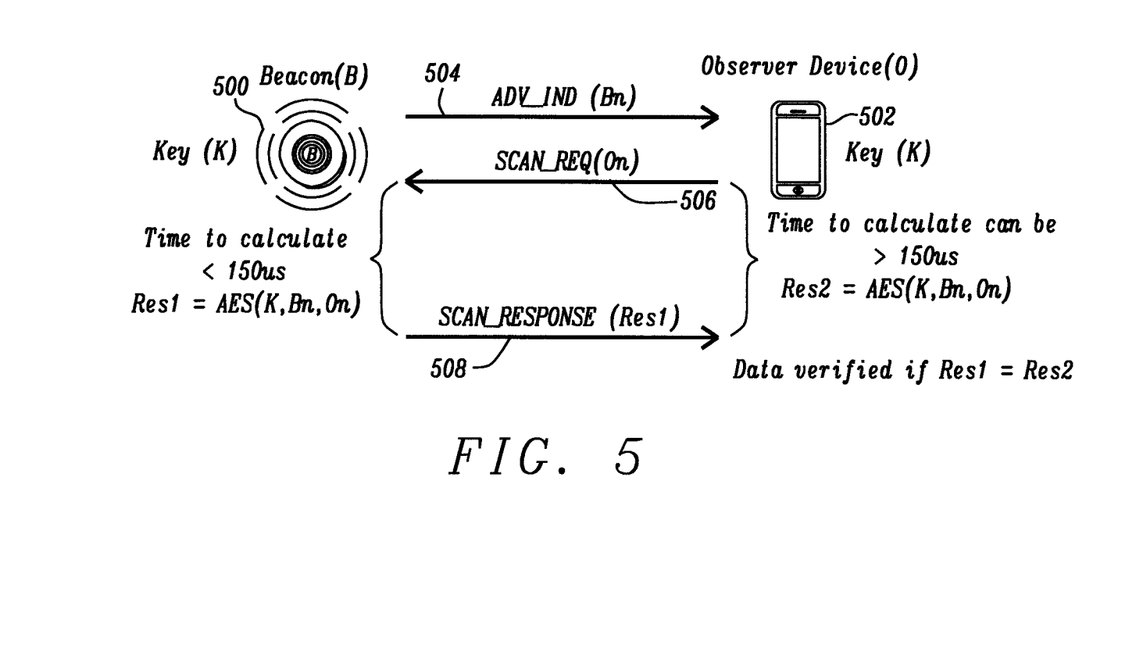
FIGS. 5 and 6 illustrate the exchange of advertising channel PDUs according to a first embodiment of the disclosure.

An embodiment of the disclosure is illustrated in FIG. 5, which shows an example implementation in BLE. Here, a broadcaster device 500 (B) and an observer device 502 (O) exchange advertising channel PDUs in a similar fashion to the process set out in FIG. 4. However, according to the discovery process as implemented in FIG. 5, the broadcaster device 500 and the observer device 502 are provisioned with a shared secret key (K). This may be done by a specific application on a phone or a computer.

The broadcaster device 500 transmits an advertising PDU 504 and includes as part of the payload a first nonce which comprises a random number Bn. This random number Bn is preferably different in every packet that is broadcast. It will be appreciated that the disclosure is not limited to any particular size of random number. If the observer device 502 is in a scanning state it receives an advertising PDU 504 and then generates a second nonce which comprises a second random number On.

The observer device 502 then sends a scanning PDU 506 which includes as part of its payload the second random number On. The broadcaster device 500 then encrypts the two random numbers Bn and On with the key K, obtaining a result Res1. The broadcaster device 500 then sends a scanning PDU 508 back to the broadcaster device 502 which includes the result Res1 of the encryption, together with the other data that is associated with a host of the broadcaster device 500.

The observer device 502 also encrypts then decrypts the two random numbers Bn and On with the key K, obtaining a result Res2. It then makes a check to see if Res1 and Res2 match, and the data that it receives is verified only if there is a match. If the data is not verified, the observer device 502 may discard it. The broadcaster 500 may also be blacklisted, that is, its identity may be stored so that any interactions with that same broadcaster device 500 in the future are ignored.

The verification means that the observer device 502 can be sure that the broadcaster 500 it is interacting with is a legitimate device and not an imposter device and thus provides a defense against replay attacks.

Figure 6:
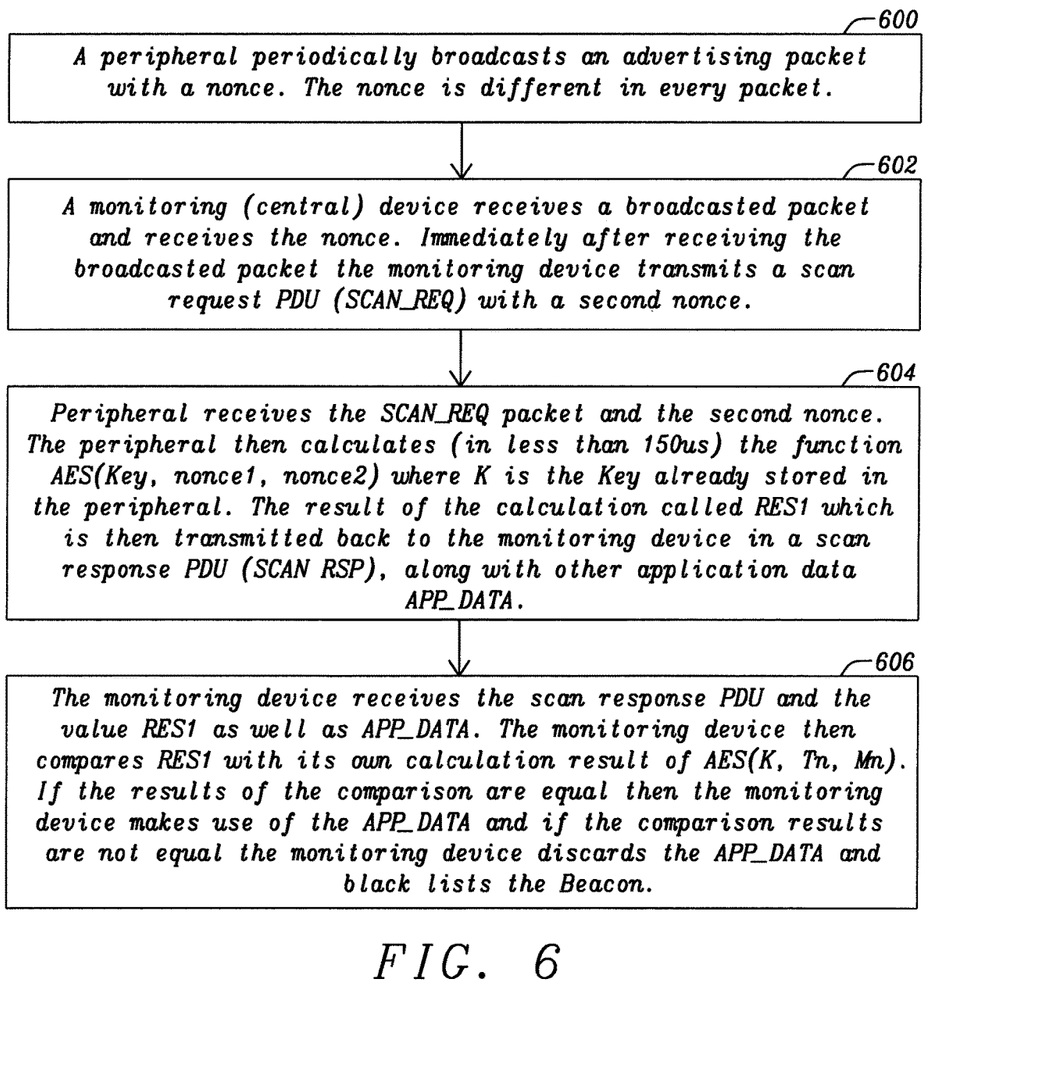

Further details of the process are also illustrated in FIG. 6. At step 600, a broadcaster (such as a beacon) periodically broadcasts an advertising packet with a nonce. The nonce is different in every packet.

At step 602, a observer device (which can also generally be called a monitoring device) receives a broadcasted packet and receives the nonce. Immediately after receiving the broadcasted packet the monitoring device transmits a scan request PDU (SCAN_REQ) with a second nonce.

At step 604, the broadcaster receives the SCAN_REQ packet and the second nonce. The broadcaster then calculates (in less than 150 uS) the function AES(Key, nonce1, nonce2) where K is the Key already stored in the peripheral. The result of the calculation called RES1 which is then transmitted back to the monitoring device in a scan response PDU (SCAN_RSP), along with other application data APP_DATA.

At step 606, the monitoring device receives the scan response PDU and the value RES1 as well as APP_DATA. The monitoring device then compares RES1 with its own calculation result of AES(K, Bn, On). If the results of the comparison are equal then the monitoring device makes use of the APP_DATA and if the comparison are not equal the monitoring device discards the APP_DATA and black lists the beacon.

The broadcaster and the observer device both use the same encryption function. Any suitable cryptography algorithm can be used. Any one-way hash function can be used. One possible technique is the Advanced Encryption Standard (AES). Hardware or firmware for performing this encryption method or others can be integrated together with the relevant hardware, firmware and software for implementing the BLE or other wireless data exchange.

While a symmetric key implementation has been illustrated, the disclosure can also support cryptographic algorithms which employ asymmetric keys. In those embodiments which employ asymmetric keys, the broadcaster device 500 and observer device 502 of FIG. 5 could exchange a public key and use private keys to encrypt and decrypt the random numbers which are generated.

Figure 7:
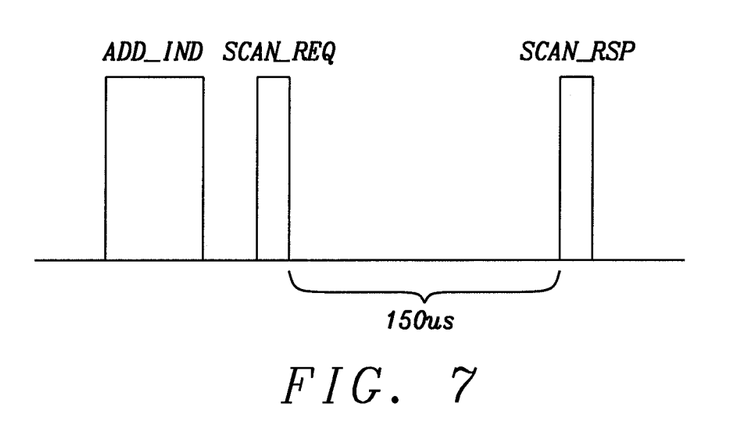
FIG. 7 illustrates the timing of the exchange of advertising channel PDUs in the process illustrated in FIGS. 5 and 6.

The disclosure is not limited to any specific format for the first and second random numbers Bn, On and the symmetric key K, but for purposes of illustration, a suitable specification of these numbers for the purposes of a BLE implementation may be as follows:

The first random number Bn transmitted in the advertising PDU 504 could satisfy one, more or all of the following requirements:
  The random number shall have no more than twelve consecutive zeros or ones
  The random number shall not be a sequence that differs from the previous random number by only one bit
  The random number shall not have all eight octets equal
  The random number shall have no more than 48 transitions
  The random number shall have a minimum of four transitions in the most significant twelve bits The key K shared by the broadcaster device 500 and the observer device 502 could satisfy one, more or all of the following requirements:
  The Key shall have no more than twelve consecutive zeros or ones
  The Key shall not have all eight octets equal
  The Key shall have no more than 48 transitions
  The Key shall have a minimum of four transitions in the most significant twelve bits The second random number On transmitted in the response scanning PDU 508 could for example be a 48-bit random number. This size is compatible with BLE specifications, for example version 4.0 specifies a SCAN_REQ packet with the first 48 bits being the observer device's address and the following 48 bits as being the peripheral's address. The number On could satisfy one, more or all of the following requirements:
  The random number shall have no more than nine consecutive zeros or ones
  The random number shall not be a sequence that differs from the previous random number by only one bit
  The random number shall not have all six octets equal
  The random number shall have no more than 36 transitions
  The random number shall have a minimum of four transitions in the most significant nine bits As shown in FIG. 7, the Bluetooth specification requires the transmission of a scan response PDU within a set time limit from the transmission of a scan request. In the case of Bluetooth 4.0, the required time is 150 μs.

The present disclosure makes the necessary calculations (of Res1, Res2) within this time period, and indeed within 1 ms. The time taken to perform the calculations depends on the choice of the random numbers Bn, On and the key K, as well as the speed of the hardware, firmware and software that is used for carrying out the calculations. The above specific example illustrates exemplary choices of Bn, On and K that will enable rapid calculation with most available device implementations.

Complying with this time limit helps guard against relay attacks (where communication with both sides is initiated by an attacker who relays messages between the two sides) and against man-in-the-middle attacks (where an attacker intercepts and manipulates communications between two parties which are initiated by one of the parties), because both of these attacks require time from an adversary in order to be implemented.

The embodiment of FIG. 5 is illustrated with a connectable undirected advertising event PDU, ADV_IND. However, the disclosure may also function with a scannable undirected advertising event ADV_SCAN_IND.

Also there are various PDU types defined by an advertising PDU header which are reserved, and the disclosure may make use of these reserved types.

The broadcaster device may in a preferred embodiment be a beacon, for example an iBeacon® as provided by Apple Computer Inc.

Consider a use case where a Beacon (B) is attached to an asset (e.g. blood measuring equipment in a hospital). An asset manager can monitor on a monitoring device (O) (e.g. a mobile phone) the position of the asset by receiving the broadcast data from the beacon. The asset manager needs to be confident that the data received is from a valid and authorized beacon and not from a hacking device (performing a replay attack). The present disclosure explains how security in the beacon can be implemented. Consider that the beacons are provisioned with a secret key K before they are attached to assets in a hospital. The provisioning of beacons can be done by a specific application on a mobile phone or on another computer. The key should be randomly generated by the provisioning master. It is also possible to provision additional auxiliary masters using a similar mechanism to the original provisioning process, so that multiple authorized monitoring devices can be provided with the security functions of the disclosure for a given set of beacons which share the same key.

When the beacons are attached to assets, the beacons periodically broadcast a set of known data (e.g. Asset ID, Co-ordinates of the position of the beacon, etc.). A monitoring device (O) (e.g. a mobile phone or a gateway) with a specific application can be used to receive data from all the beacons. The application may periodically receive data from the beacons. The device O checks the security of each beacon to check that the beacon is a legitimate device and not a hacking device. By checking the security of each beacon, the monitoring device ensures that the information received from the beacon is reliable and secure.

Additional advantages of the present disclosure include the following:
1. Using the discovery protocol enables a software based solution for the monitoring device and a hardware with software based solution on the beacon device. A beacon with suitable hardware may only require software changes to support the security solution.
2. The new data set for the security solution used in the discovery protocol is simple and easier to support.
3. The security solution can support one monitoring device to many beacons because it is fast (less than 1 millisecond).
4. The security solution is a much lower power solution than a connection based security solution.

Figure 8:
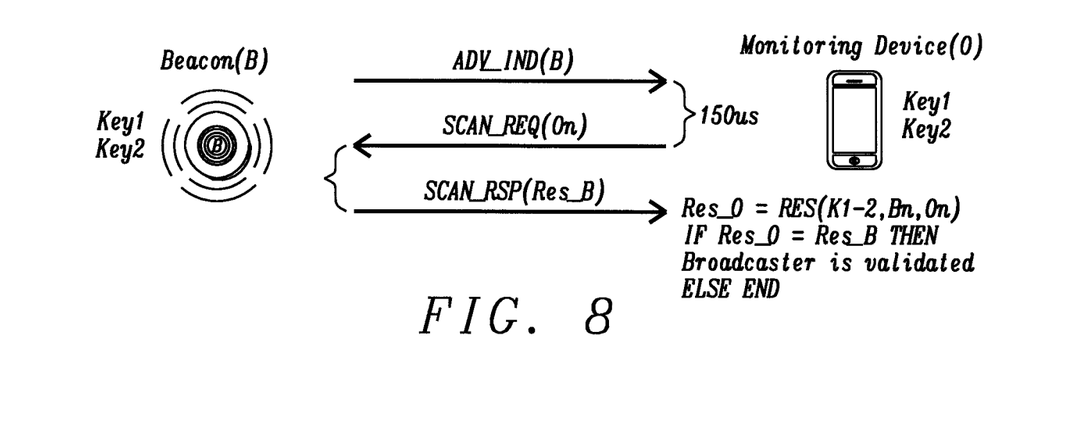
FIG. 8 illustrates the exchange of advertising channel PDUs according to a second embodiment of the disclosure.

FIG. 8 shows the exchange of advertising channel PDUs according to a second embodiment of the disclosure. This embodiment is similar to the first, except that both the broadcaster device 400 and the observer device 402 share two keys. The first key could be a public key such as a manufacturer's key. The second key could be a private key specific to a particular user.

When the broadcaster device 500 encrypts the two random numbers Bn and On, it uses a combination or concatenation of both keys to obtain result Res1. Similarly, the observer device 502 also encrypts then decrypts the two random numbers Bn and On with both keys to obtain result Res2.

Figure 9:
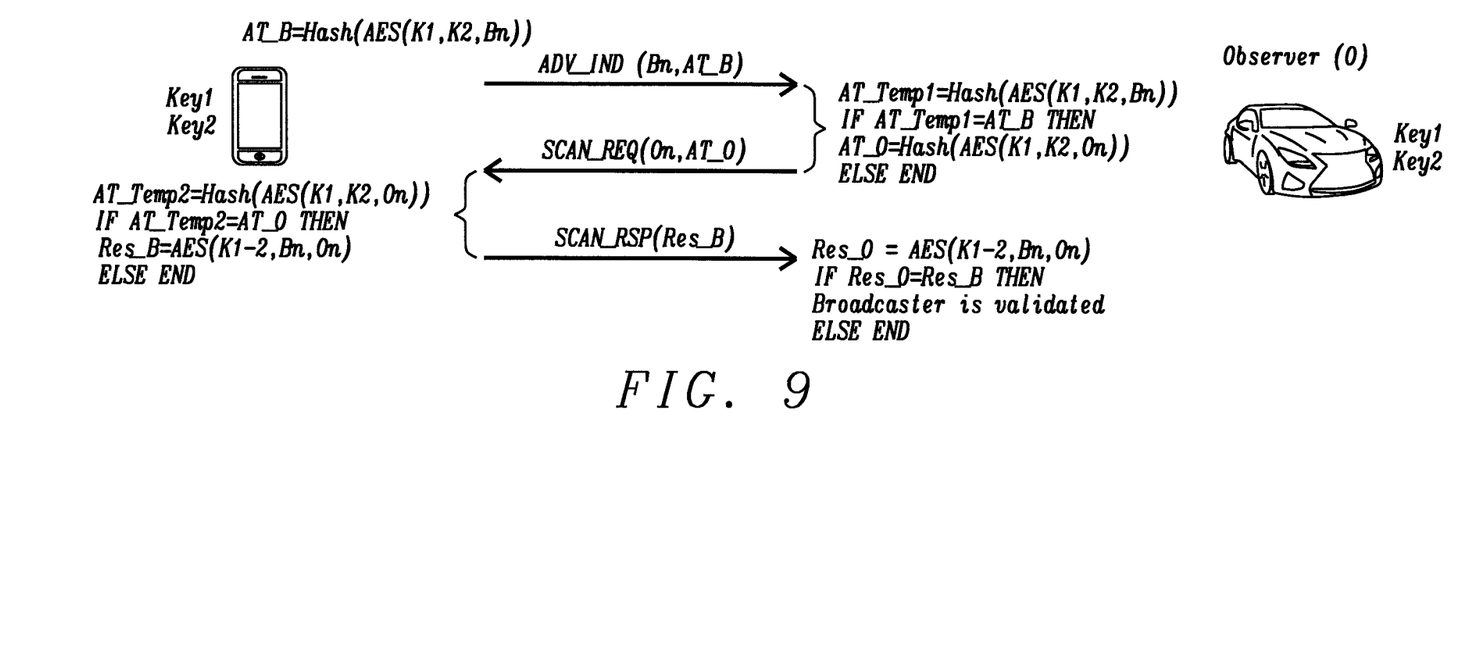
FIG. 9 illustrates the exchange of advertising channel PDUs according to a third embodiment of the disclosure.

FIG. 9 shows the exchange of advertising channel PDUs according to a third embodiment of the disclosure. In this embodiment, the broadcaster device 400 could be a mobile phone and the observer device 402 could be an access system provided on a vehicle. Such a system would allow an authenticated user to unlock and access the vehicle in a keyless manner. In other embodiments, the access system could relate to a building, vault or the like. Furthermore, the observer device could be any entity which requires authentication of and/or by a broadcaster device.

This embodiment also includes additional features for enhanced security. Firstly, the observer device and broadcaster device are both provisioned with two encryption keys, as for the second embodiment, with one of the keys being a private user key.

Also, the advertising channel PDU now includes an encrypted form of a combination or concatenation of the first nonce and both keys, as well as the unencrypted first nonce.

The observer device 402 already has the two keys and, once the advertising channel PDU has been received, it has the first nonce. The observer device 402 also encrypts a combination or concatenation of the first nonce and the keys to obtain a third result. This third result is compared with the encrypted form received from the advertising channel PDU. The observer device 402 only sends the scan request scanning PDU to the broadcaster device 400 if the third result matches the encrypted form.

Furthermore, the scan request scanning PDU comprises an encrypted form of a combination or concatenation of the second nonce and both keys. as well as the unencrypted second nonce.

The broadcaster device 400 encrypts a combination or concatenation of the second nonce and the keys to obtain a fourth result and compares the fourth result with the encrypted form received from the scan request scanning PDU. The broadcaster device 400 only sends the scan response scanning PDU to the observer device 402 if the fourth result matches the encrypted form.

In this embodiment, the broadcaster device 400 authenticates the observer device 402 and also the observer device 402 authenticates the broadcaster device 400.

As a further security measure, a first time interval, which is the time between the scan request scanning PDU and the scan response scanning PDU, is determined. The observer device 402 only authenticates the broadcaster device if the determined first time interval is about 150 μs, such as +/−1 μs.

Certain other aspects of the present disclosure provide a method of determining a distance between a first and a second device in a wireless data exchange protocol. This method also makes use of the BLE discovery procedure.

Referring again to FIG. 4, a first device, which is a broadcaster device 400, transmits an ADV_IND advertising channel PDU regularly (for example every 1 s). The broadcaster device 400 could be a static BLE beacon located in, say, a shopping mall. When a second device, which is an observer device 402 such as a mobile phone carried by a user, comes within range, it receives this transmission and immediately responds with a SCAN_REQ PDU. Once this is received by the broadcaster device 400, it sends a SCAN_RESPONSE PDU with data for use by the observer device 402.

According to the present disclosure, the broadcaster device 400 is adapted to calculate a time of flight (TOF) for at least one of the sent PDUs. The calculated TOF is used to determine the distance between the broadcaster device 400 and the observer device 402. In alternative embodiments, the observer device 402 (or both devices) may be adapted to calculate the TOF and/or to determine the distance between the devices.

All of the sent PDUs comprise a carrier signal (C) which has been modulated by the PDU data. The Bluetooth protocol uses frequency hopping when transmitting radio signals by rapidly switching the carrier signal among many frequency channels. This is advantageously used by the present disclosure when calculating the TOF.

For two separated devices, a phase difference occurs between any transmitted signal and the corresponding received signal since it takes time for the radio signal to travel between the two devices. This phase difference will vary depending on the frequency of the carrier signal. However, it is known that the phase difference between the phases of the carrier frequency at different frequencies is directly proportional to the distance between the devices.

When the observer device 402 has received the ADV_IND PDU, this signal is demodulated to obtain the PDU data. The demodulated signal (C') will comprise a sequence of carrier signals at different frequencies. The demodulated signal (C') is used as a reference signal when generating the carrier signal for the subsequent SCAN_REQ PDU. Thus, the phase information of the first signal is transferred to the second signal. The SCAN_REQ PDU is then transmitted to the broadcaster device 400.

The broadcaster device 400 receives the SCAN_REQ PDU and demodulates the signal to obtain the PDU data. The demodulated signal (C") will comprise the original carrier signal (C) which has been phase shifted twice (once travelling from the broadcaster device 400 to the observer device 402 and once travelling back from the observer device 402 to the broadcaster device 400).

The carrier and reference signals are sinusoidal waves. Any sinusoidal wave can be represented mathematically as: A sin($2\pi f_i t + \varphi$), where A is the amplitude, $f_i$ is the sequence of frequencies and $\varphi$ is the phase of the wave. The original carrier signal (C) has zero phase and, for determining the phase shift, the amplitude can be neglected. Therefore, the carrier signal (C) can be represented as: sin($2\pi f_i t$), The twice phase shifted carrier signal (C") can be represented as: sin($2\pi f_i(t-2\tau)$), where $\tau$ is the one-way time delay.

Figure 10:
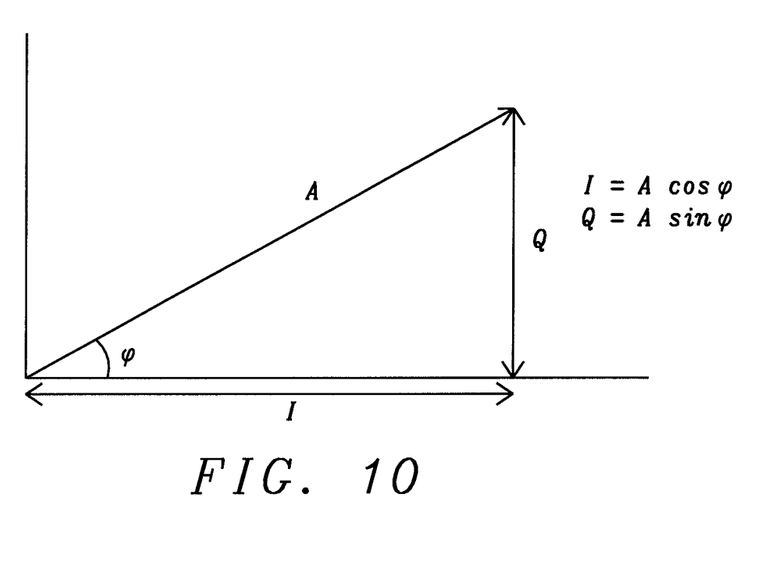
FIG. 10 is a polar representation of a sinusoidal wave with a phase shift and showing the I and Q components.

The carrier signal (C) and the twice phase shifted carrier signal (C") are compared. This is done by generating in-phase (I) and quadrature (Q) DC signals to determine the phase shift. Any sinusoidal wave which has a phase shift can be decomposed into, or synthesized from, two amplitude-modulated sinusoids that are offset in phase by 90 degrees. These are the I and Q components. FIG. 10 shows a polar representation of a sinusoidal wave with a phase shift $\phi$ and notes the I and Q components. As shown in the figure:

I=A cos $\varphi$
Q=A sin $\varphi$

Therefore:

$$\frac{Q}{I} = \frac{A\sin\varphi}{A\cos\varphi} = \tan\varphi$$

Since $\varphi=2\pi f_i(2\tau)$, the I and Q data can be solved for $\tau$ as follows:

$$\frac{Q}{I} = \tan(2\pi f_i \cdot 2\tau)$$

$$\tau = \left(\frac{\tan^{-1}\left(\frac{Q}{I}\right)}{4\pi f_i}\right)$$

Figure 11:
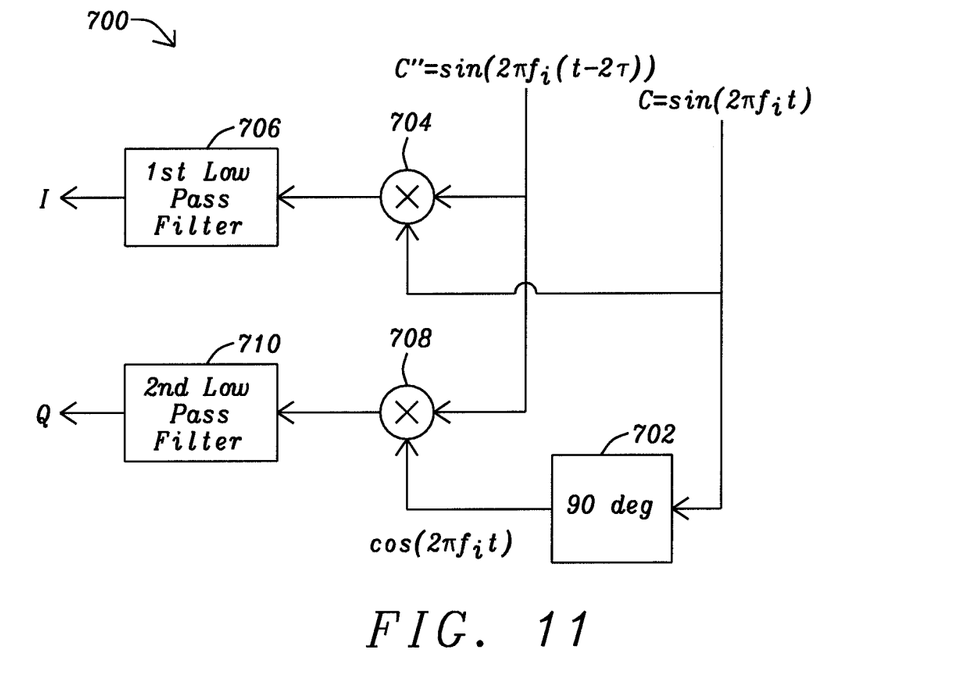
FIG. 11 is a block diagram of a phase detector for generating I and Q data.

To implement the mathematics above, the I and Q signals are generated using a phase detector 700, as shown in FIG. 11. The carrier signal (C) and the twice phase shifted carrier signal (C") are mixed using a first RF mixer 704. In mathematical terms, this is equivalent to multiplying the two signals: C.C". The trigonometric identity for the multiplying of two sine waves, a and b, in a general form (for clarity) is:

$$\sin a \cdot \sin b = \frac{1}{2}[\cos(a-b) - \cos(a+b)]$$

Therefore, the mixed signal has two separate frequency components: (a−b) and (a+b).

The mixed signal is then passed through a first low pass filter 706. This removes the higher frequency component (a+b). For the specific signals of C and C", the resulting low frequency component of the mixed signal (ignoring amplitude) is cos $\phi$, which corresponds to I as shown above.

The carrier signal (C) is also passed to a 90 degree phase shifter 702. The output of the 90 degree phase shifter 702 is therefore: cos($2\pi f_i t$). This output is mixed with the twice phase shifted carrier signal (C") by a second RF mixer 708 and then passed through a second low pass filter 710. The relevant trigonometric identity for the mixing of these two signals is:

$$\cos a \cdot \sin b = \frac{1}{2}[\sin(a+b) - \sin(a-b)]$$

For the specific signals of C and C", the resulting low frequency component of the mixed signal (ignoring amplitude) is sin $\phi$, which corresponds to Q as shown above. Therefore, the output of the first mixer 704 and the second mixer 708 are the I and Q data respectively.

The phase shift for each frequency can then be determined: ($\varphi_i = 2\pi f_i \cdot 2\tau$)

Figure 12:
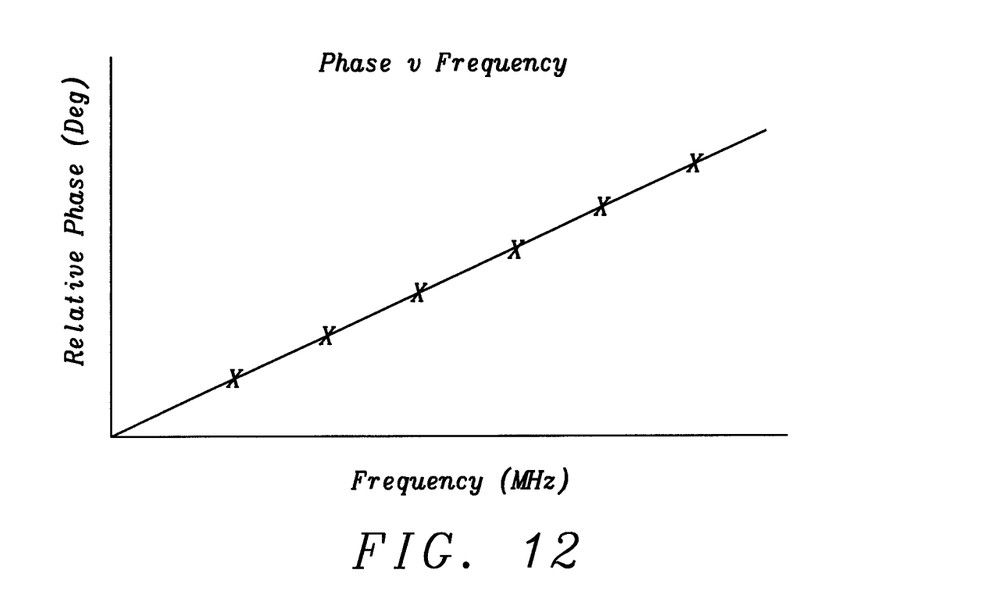
FIG. 12 is a plot of phase against frequency for two separated devices.

As is clear from the last equation, the phase shift at a particular frequency is directly proportional to the time delay. The time delay is directly proportional to the distance between the devices. Therefore, if a plot of phase shift against frequency is made, the result is a straight line and the distance can be determined from the gradient of the line. This is shown in FIG. 12.

In practice, to remove error, a least mean square criterion can be used to obtain the straight line.

The above equation can be rearranged to give:

$$\tau = \frac{1}{4\pi} \cdot \frac{\varphi_i}{f_i}$$

Or:

$$\tau = \frac{1}{4\pi} \cdot m$$

where m is the gradient of the straight line of phase shift plotted against frequency (as shown in FIG. 12).

The distance, D, between the devices is: D=c.$\tau$
where c is the speed of light ($3\times10^8$ m/s).

The present disclosure provides a more accurate method of calculating the distance between two devices than can be obtained using the likes of RSSI. By using the frequency hopping procedure of BLE, a more accurate measure of distance is obtained. The method also utilises the BLE discovery procedure and so provides a rapid calculation of distance using existing sent signals. Existing BLE devices can be readily upgraded so they can implement this method of distance calculation.

The method of determining a distance between two devices of the present disclosure is particularly suitable for use with BLE beacons but can be used in many other applications. Many of these relate to indoor proximity detecting systems or indoor positioning systems (IPS). However, another possible application is for use with a vehicle key fob.

Various modifications and improvements can be made to the above without departing from the scope of the disclosure. For instance, a different means of calculating the distance may be employed. There are other existing algorithms for calculating the distance between two devices, using the phase shift method or otherwise. As an example, the phase shift method is frequently used by laser range finding devices.

What is claimed is:

1. A method of determining a distance between a first and a second device in a wireless data exchange protocol, the method comprising:
sending an advertising channel Protocol Data Unit (PDU) from the first device via a first carrier signal;
receiving the advertising channel PDU at the second device and responsively demodulating the received advertising channel PDU and sending a scan request scanning PDU from the second device to the first device using the demodulated advertising channel PDU as a reference signal when generating a second carrier signal for the scan request PDU;
receiving the scan request scanning PDU at the first device and responsively demodulating the received scan request scanning PDU to obtain the PDU data
and, at one of the devices, comparing the first carrier signal and the second carrier signal by generating in-phase and quadrature DC signals to determine a phase shift between the first and second carrier signals, and
based on the comparison calculating using a processor of the device a time of flight (TOF) for at least one of the sent PDUs; and
determining the distance between the first and second devices using the calculated TOF.

2. The method as claimed in claim 1, wherein the wireless data exchange protocol is a Bluetooth Low Energy (BLE) protocol.

3. The method as claimed in claim 1, wherein the first device comprises a broadcaster device, and the second device comprises an observer device.

4. The method as claimed in claim 1, wherein the sent PDUs are transmitted using a multi-frequency carrier signal, and wherein the step of calculating the TOF includes determining a phase offset for a plurality of frequencies of the multi-frequency carrier signal.

5. The method as claimed in claim 4, wherein the step of calculating the TOF includes determining a gradient of the sequence of phase offsets relative to frequencies of the multi-frequency carrier signal.

6. The method as claimed in claim 1, wherein the method includes the step of authenticating the first device at the second device.

7. The method as claimed in claim 6, wherein the time between the scan request scanning PDU and the scan response scanning PDU is 150 µs.

8. The method of claim 1, further comprising sending a scan response scanning PDU from the first device to the second device.

9. The method as claimed in claim 8, wherein the advertising channel PDU includes a first nonce and the scan request scanning PDU includes a second nonce, and the first device is adapted to perform an encryption function using said first and second nonces to obtain a first result.

10. The method as claimed in claim 9, wherein the scan response scanning PDU includes said first result, and the second device is adapted to perform an encryption function on said first and second nonces to obtain a second result, and wherein the second device authenticates the first device if said first and second results match.

11. The method as claimed in claim 9, wherein the first and second nonces comprise random numbers, and wherein the first and second devices are both provisioned with at least one key for performing the encryption function.

12. The method as claimed in claim 9, wherein the first and second devices are both provisioned with at least two keys for performing the encryption function, and wherein at least one key is a private user key.

13. The method as claimed in claim 9, wherein said advertising channel PDU comprises an encrypted form of at least the first nonce.

14. The method as claimed in claim 9, wherein said scan request scanning PDU comprises an encrypted form of the second nonce.

15. The method as claimed in claim 10, wherein the second device encrypts at least the first nonce to obtain a third result and compares the third result with the encrypted form received from the advertising channel PDU, and wherein the second device sends the scan request scanning PDU to the broadcaster device only if the third result matches the encrypted form.

16. The method as claimed in claim 15, wherein the first device encrypts at least the second nonce to obtain a fourth result and compares the fourth result with the encrypted form received from the scan request scanning PDU, and wherein the first device sends the scan response scanning PDU to the second device only if the fourth result matches the encrypted form.

17. A system for determining a distance between a first computing device and a second computing device in a wireless data exchange protocol, the system comprising: the first computing device adapted to send an advertising channel Protocol Data Unit (PDU) via a first carrier signal; the second computing device adapted to receive the advertising channel PDU and responsively demodulate the received advertising channel PDU and send a scan request scanning PDU to the first computing device using the demodulated advertising channel PDU as a reference signal when generating a second carrier signal for the scan request PDU, wherein the first computing device is adapted to receive the scan request scanning PDU and responsively demodulate the received scan request scanning PDU to obtain the PDU data;
and wherein one of the computing devices is adapted to compare the first carrier signal and the second carrier signal by generating in-phase and quadrature DC signals to determine a phase shift between the first and second carrier signals and based on the comparison, using the first or second computing device, to calculate a time of flight (TOF) for at least one of the sent PDUs, and determine the distance between the first and second computing devices using the calculated TOF.

18. A broadcaster device adapted to determine a distance between the broadcaster device and an observer device in a wireless data exchange protocol, wherein the broadcaster device is adapted to send an advertising channel Protocol Data Unit (PDU) via a first carrier signal to an observer device which responsively demodulates the received advertising channel PDU and sends a scan request scanning PDU to the broadcaster device using the demodulated advertising channel PDU as a reference signal when generating a second carrier signal for the scan request PDU, and wherein the broadcaster device is adapted to receive the scan request scanning PDU and responsively demodulate the received scan request scanning PDU to obtain the PDU data; and wherein the broadcaster device is adapted to compare the first carrier signal and the second carrier signal by generating in-phase and quadrature DC signals to determine a phase shift between the first and second carrier signals and, based on the comparison, calculate, using a processor of the broadcaster device, a time of flight (TOF) for the scan request scanning PDU and to determine the distance between the broadcaster device and the observer device using the calculated TOF.

\* \* \* \* \*